United States Patent
Shin

(10) Patent No.: US 9,789,842 B2
(45) Date of Patent: Oct. 17, 2017

(54) PASSENGER AIRBAG APPARATUS AND METHOD OF MANUFACTURING THE SAME

(71) Applicant: HYUNDAI MOBIS Co., Ltd., Yongin-si, Gyeonggi-do (KR)

(72) Inventor: Seok Min Shin, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/097,800

(22) Filed: Apr. 13, 2016

(65) Prior Publication Data

US 2017/0166159 A1  Jun. 15, 2017

(30) Foreign Application Priority Data

Dec. 11, 2015  (KR) .......................... 10-2015-0177090

(51) Int. Cl.
*B60R 21/2338* (2011.01)
*B60R 21/233* (2006.01)
*B60R 21/00* (2006.01)

(52) U.S. Cl.
CPC ........ *B60R 21/233* (2013.01); *B60R 21/2338* (2013.01); *B60R 2021/0009* (2013.01); *B60R 2021/0048* (2013.01); *B60R 2021/23308* (2013.01)

(58) Field of Classification Search
CPC ...... B60R 21/2338; B60R 2021/23382; B60R 2021/23386
See application file for complete search history.

(56) References Cited

U.S. PATENT DOCUMENTS

| 7,484,757 | B2 * | 2/2009 | Thomas | B60R 21/231 280/743.2 |
| 7,862,073 | B2 * | 1/2011 | Thomas | B60R 21/231 280/729 |
| 9,216,712 | B1 * | 12/2015 | Kwon | B60R 21/2338 |
| 9,290,149 | B2 * | 3/2016 | Yamada | B60R 21/231 |
| 2004/0256848 | A1 * | 12/2004 | Miyata | B60R 21/233 280/743.2 |
| 2007/0024032 | A1 * | 2/2007 | Hasebe | B60R 21/237 280/729 |
| 2007/0187932 | A1 * | 8/2007 | Sekizuka | B60R 21/233 280/730.1 |

(Continued)

FOREIGN PATENT DOCUMENTS

| JP | 2014-237382 A | 12/2014 |
| KR | 10-2007-0052192 A | 5/2007 |

OTHER PUBLICATIONS

Nov. 18, 2016, Korean Office Action for related KR application No. 10-2015-0177090.

*Primary Examiner* — James A English
(74) *Attorney, Agent, or Firm* — Paratus Law Group, PLLC

(57) ABSTRACT

According to a passenger airbag apparatus according to an exemplary embodiment of the present invention, a left chamber portion and a right chamber portion protrude forward at a front side of an airbag so as to be spaced apart from each other in a left and right direction, and a groove tether pulls the front side of the airbag between the left chamber portion and the right chamber portion, and as a result, a groove is formed at the front side of the airbag between the left chamber portion and the right chamber portion.

13 Claims, 9 Drawing Sheets

(56) References Cited

U.S. PATENT DOCUMENTS

| | | | |
|---|---|---|---|
| 2007/0252365 A1* | 11/2007 | Urushibata | B60R 21/233 280/729 |
| 2010/0032931 A1* | 2/2010 | Kumagai | B60R 21/2338 280/742 |
| 2010/0102542 A1* | 4/2010 | Nakajima | B60R 21/233 280/743.2 |
| 2011/0018240 A1* | 1/2011 | Marable | B60R 21/231 280/728.3 |
| 2011/0031725 A1* | 2/2011 | Rose | B60R 21/2338 280/736 |
| 2011/0309605 A1* | 12/2011 | Kumagai | B60R 21/2338 280/741 |

* cited by examiner

PASSENGER AIRBAG APPARATUS AND METHOD OF MANUFACTURING THE SAME

CROSS-REFERENCE TO RELATED APPLICATIONS

The present application claims priority to Korean Patent Application Number 10-2015-0177090 filed Dec. 11, 2015, the entire contents of which the application is incorporated herein for all purposes by this reference.

TECHNICAL FIELD

The present invention relates to a passenger airbag apparatus and a method of manufacturing the same, and more particularly, to a passenger airbag apparatus, in which a left chamber portion and a right chamber portion protrude forward at a front side of an airbag so as to be spaced apart in a left and right direction, and a method of manufacturing the same.

BACKGROUND

In general, a passenger airbag apparatus is installed at an upper side of a glove box disposed in front of a front passenger seat, and more particularly, the passenger airbag apparatus is disposed in an instrument panel.

The passenger airbag apparatus includes an airbag which is inflated and deployed when gas flows into the airbag and protects a passenger, and an airbag housing which accommodates the airbag. The airbag is accommodated in the airbag housing, and thereafter, the airbag housing is installed in the instrument panel.

The airbag is folded several times so as to be accommodated in the airbag housing, the airbag is surrounded by an airbag cover to maintain the folded shape of the airbag, and then the airbag is accommodated in the airbag housing.

At the time of a vehicle accident, an inflator generates gas, and the airbag is inflated by the generated gas. Thereafter, while an upper skin of the instrument panel is torn by expansive force of the airbag, the airbag is deployed between a windshield and the instrument panel and covers the instrument panel, thereby protecting the passenger.

However, in a case in which the vehicle collides with an object obliquely with respect to a direction in which the vehicle travels, the passenger's head, which is in contact with the airbag, slides toward one side and deviates from the airbag, and as a result, there is a problem in that the passenger's head cannot be protected by the airbag.

SUMMARY

The present invention has been made in an effort to provide a passenger airbag apparatus and a method of manufacturing the same, which are capable of preventing a passenger's head, which is in contact with an airbag, from deviating from the airbag when a vehicle collides with an object obliquely with respect to a direction in which the vehicle travels.

Technical problems of the present invention are not limited to the aforementioned technical problem, and other technical problems, which are not mentioned above, may be clearly understood by those skilled in the art from the following descriptions.

An exemplary embodiment of the present invention provides a passenger airbag apparatus including: an airbag which is deployed forward toward a passenger when gas flows into the airbag, and has a left chamber portion that protrudes forward at a left side of a front side of the airbag, and a right chamber portion that protrudes forward at a right side of the front side of the airbag so as to be spaced apart from the left chamber portion; and a groove tether which is coupled to the front side of the airbag, between the left chamber portion and the right chamber portion which are spaced apart from each other, and left and right sides of the airbag and pulls the front side of the airbag between the left chamber portion and the right chamber portion, which are spaced apart from each other, as the airbag is inflated.

Another exemplary embodiment of the present invention provides a method of manufacturing a passenger airbag apparatus, the method including: spreading out a main panel which has a cushion hole formed at a portion that forms a front side of an airbag; coupling a groove panel to the front side to shield the cushion hole; coupling a groove tether to the groove panel; coupling the groove tether to a pair of side panels which has protruding portions that protrude forward at positions corresponding to the cushion hole; and coupling circumferences of the pair of side panels to both sides of the main panel, such that a left chamber portion and a right chamber portion, which protrude forward, are formed at the front side of the airbag which corresponds to the protruding portions, and the airbag is completely manufactured.

Other detailed matters of the exemplary embodiment are included in the detailed description and the drawings.

According to the passenger airbag apparatus according to the exemplary embodiment of the present invention and the passenger airbag apparatus manufactured by the method of manufacturing the same, the head of the passenger is inserted between the left chamber portion and the right chamber portion of the airbag at the time of a vehicle collision, and as a result, even though the vehicle collides with an object obliquely with respect to the direction in which the vehicle travels, the head of the passenger does not slide to the left or right, thereby maintaining a contact state with the airbag.

In addition, only one cushion hole is formed from the right side of the left chamber portion to the left side of the right chamber portion, and then the groove panel shields the cushion hole, such that the left chamber portion and the right chamber portion may be formed in the airbag, and as a result, the process of forming the left chamber portion and the right chamber portion is simplified.

The effects of the present invention are not limited to the aforementioned effects, and other effects, which are not mentioned above, will be clearly understood by those skilled in the art from the claims.

DETAILED DESCRIPTION

Figure 1:
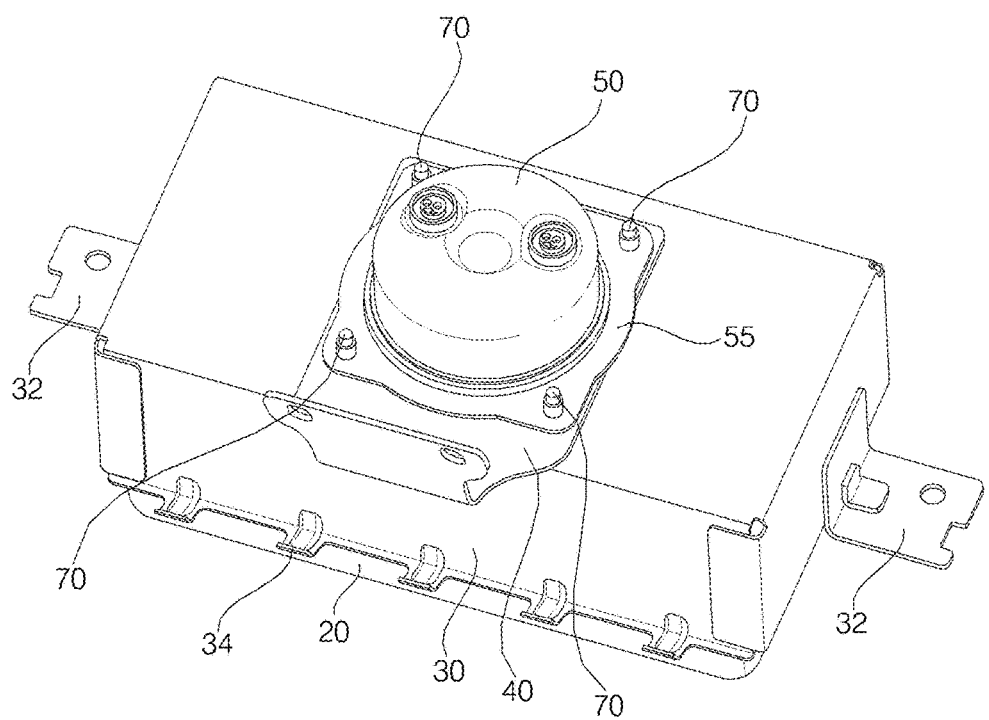
FIG. 1 is a rear perspective view illustrating a passenger airbag apparatus according to an exemplary embodiment of the present invention.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a passenger airbag apparatus according to the exemplary embodiment of the present invention and a method of manufacturing the same will be described with reference to the drawings.

Figure 2:
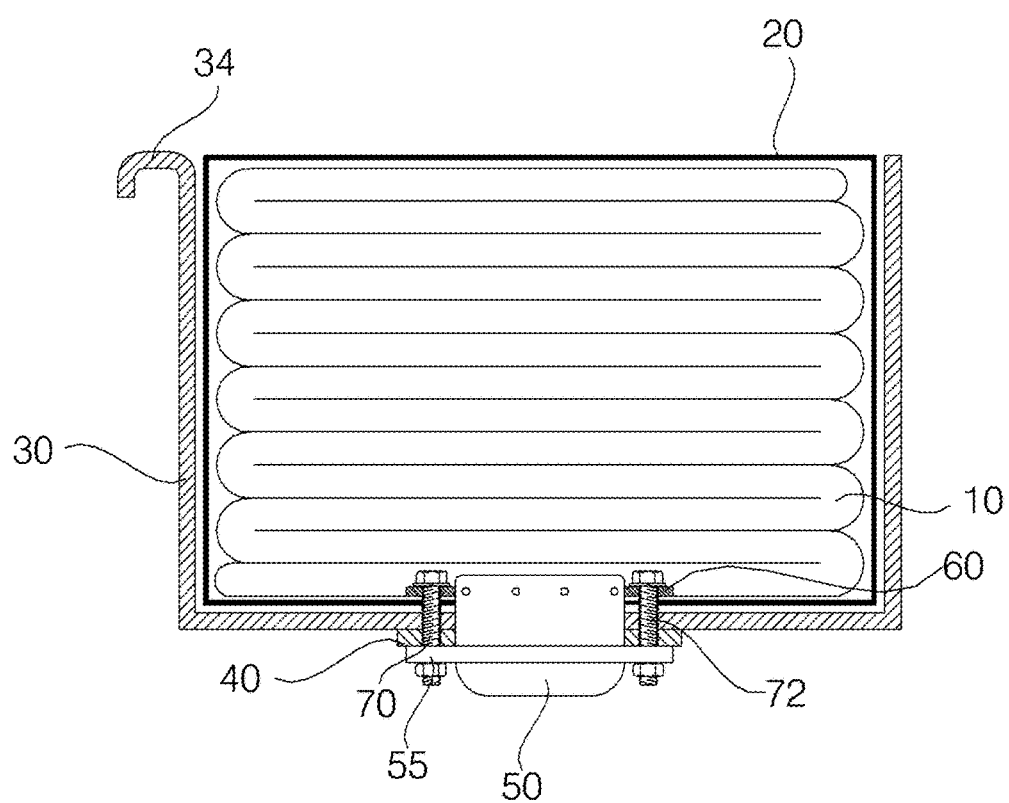
FIG. 2 is a cross-sectional view illustrating the passenger airbag apparatus according to the exemplary embodiment of the present invention.

FIG. 1 is a rear perspective view illustrating a passenger airbag apparatus according to an exemplary embodiment of the present invention, and FIG. 2 is a cross-sectional view illustrating the passenger airbag apparatus according to the exemplary embodiment of the present invention.

Referring to FIGS. 1 and 2, a passenger airbag apparatus according to an exemplary embodiment of the present invention includes an airbag 10, an airbag cover 20, an airbag housing 30, a front mounting plate 40, an inflator 50, and a retainer 60.

When gas generated by the inflator 50 flows into the airbag 10, the airbag 10 is inflated and deployed forward toward a passenger seated in a vehicle, and protects the passenger with cushioning force. The airbag is made of a flexible material so that the airbag may be inflated, and the airbag is folded in a predetermined shape and surrounded by the airbag cover 20 so that the folded shape is not unfolded, and then the airbag, together with the airbag cover 20, is accommodated in the airbag housing 30.

The airbag cover 20 is made of a flexible material, and surrounds the folded airbag 10. The airbag cover 20 may be made of the same raw fabric as the airbag 10.

The airbag cover 20 surrounds the folded airbag 10 and then accommodated in the airbag housing 30, thereby preventing the airbag 10 from being deployed before the inflator 50 is operated, and preventing the airbag 10 from being withdrawn from the airbag housing 30.

The airbag housing 30 is made of hard plastic, and coupled to a vehicle body while accommodating the airbag cover 20. Side mounting plates 32, which are coupled to the vehicle body, are coupled to both sides of the airbag housing 30, and hook catching portions 34, which are hook-caught by the vehicle body, are formed at a front side of the airbag housing 30.

The front mounting plate 40 is coupled to a lower side of the airbag housing 30, and a front side of the front mounting plate 40 is coupled to the vehicle body.

Figure 8:
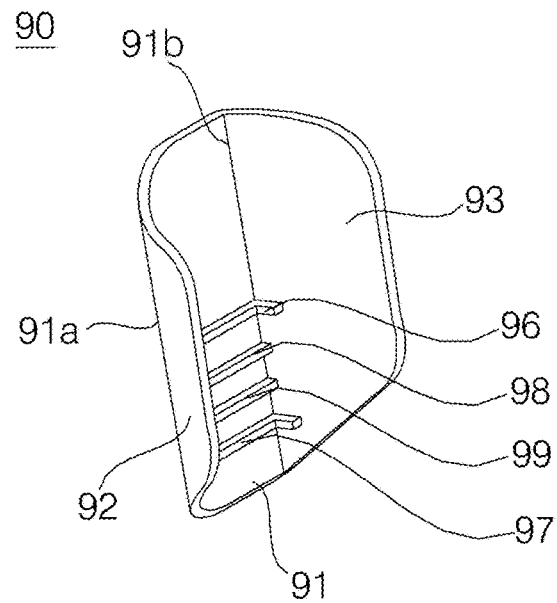
FIG. 8 is a perspective view illustrating a groove panel illustrated in FIG. 3.

The inflator 50 generates gas so as to inflate the airbag 10. A head portion of the inflator 50 through which gas is injected is inserted into the airbag housing 30 from a lower side of the airbag housing 30 and then inserted into the airbag 10. As illustrated in FIG. 8, a circular first inflator insertion hole 15a and a circular second inflator insertion hole 15b, into which the head portion of the inflator 50 is inserted, are formed in the airbag 10.

A flange 55, which is coupled to the airbag housing 30, protrudes in a radial direction around the inflator 50. The head portion of the inflator 50, which is inserted into the airbag 10, is formed at an upper side based on the flange 55.

The front mounting plate 40 couples the airbag housing 30 to the vehicle body, and the front mounting plate 40 is disposed between a lower side of the airbag housing 30 and the flange 55, and serves as a washer so as to improve coupling force of the flange 55 coupled to the airbag housing 30.

The retainer 60 is disposed inside the airbag 10, and supports the airbag 10 so that a coupled portion with the inflator 50 is not torn when the airbag 10 is inflated. The retainer 60 is coupled to the airbag housing 30 by means of fastening members 70 such as a stud bolt.

The fastening member 70 couples the retainer 60, the airbag 10, the airbag cover 20, the airbag housing 30, the front mounting plate 40, and the flange 55 of the inflator 50.

As illustrated in FIG. 8, first fastening holes 16 and second fastening holes 17 are formed in the airbag 10. Four first fastening holes 16 are formed around the first inflator insertion hole 15a while being spaced apart from the first inflator insertion hole 15a in the radial direction. In addition, four second fastening holes 17 are formed around the second inflator insertion hole 15b while being spaced apart from the second inflator insertion hole 15b in the radial direction.

The fastening member 70 protrudes from the inside of the airbag 10 to the outside of the airbag 10 while penetrating the retainer 60, the first fastening hole 16, and the second fastening hole 17, and sequentially penetrates the airbag cover 20, the airbag housing 30, the front mounting plate 40, and the flange 55, thereby coupling the retainer 60, the airbag 10, the airbag cover 20, the front mounting plate 40, and the inflator 50 to the airbag housing 30.

Figure 3:
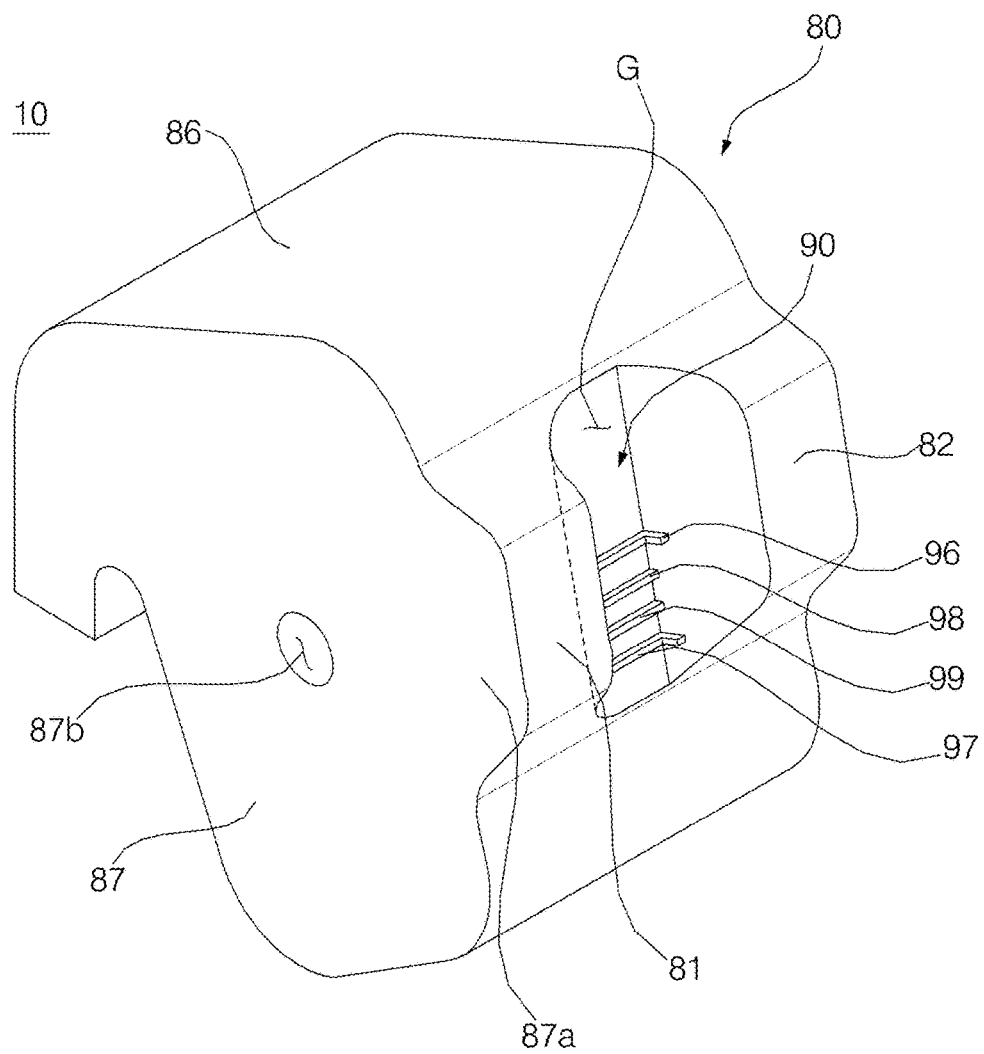
FIG. 3 is a perspective view illustrating a state in which an airbag of the passenger airbag apparatus according to the exemplary embodiment of the present invention is fully inflated.
Figure 4:
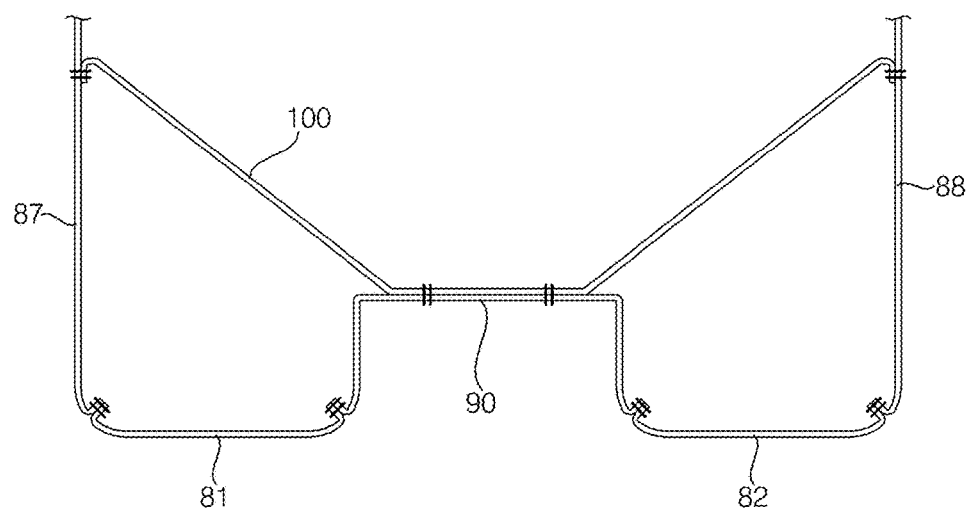
FIG. 4 is a cross-sectional top plan view illustrating the passenger airbag apparatus according to the exemplary embodiment of the present invention which is illustrated in FIG. 3.
Figure 5:
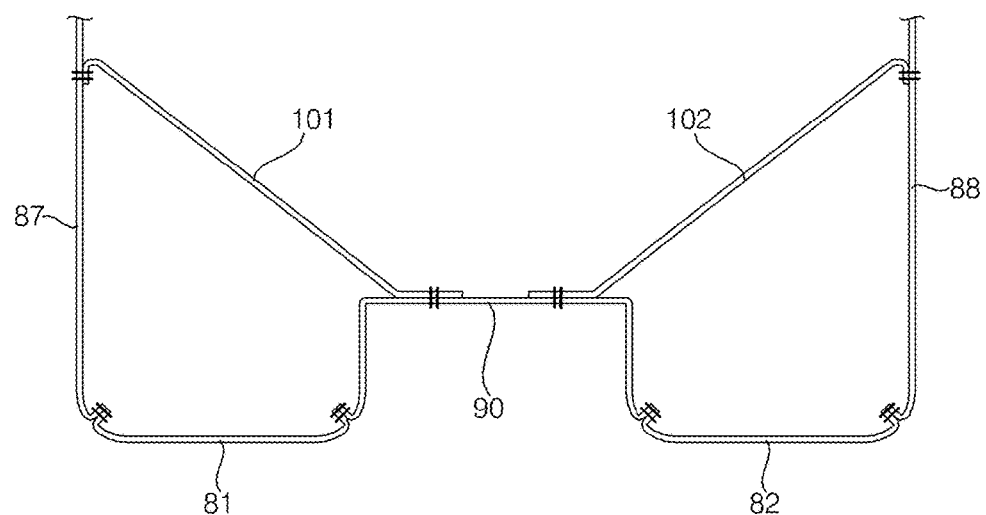
FIG. 5 is a cross-sectional top plan view illustrating another exemplary embodiment of a groove tether illustrated in FIG. 4.
Figure 6:
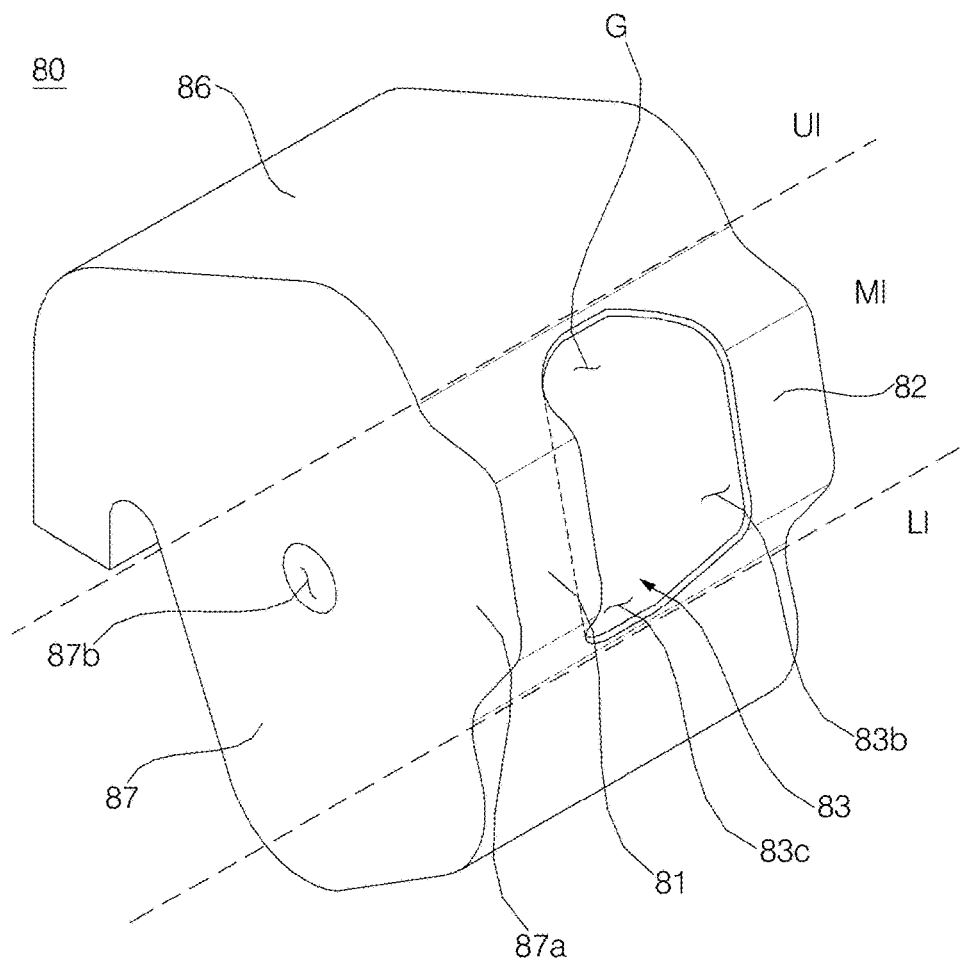
FIG. 6 is a left perspective view illustrating a cushion illustrated in FIG. 3.
Figure 7:
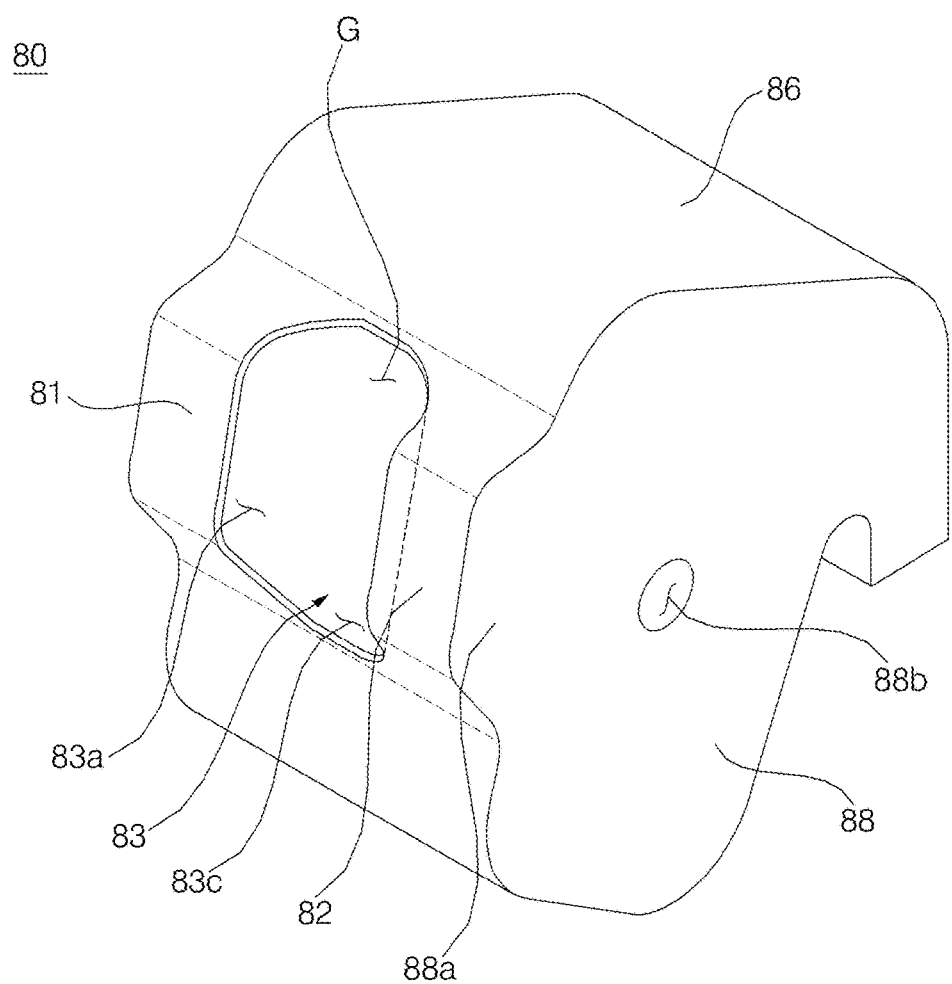
FIG. 7 is a right perspective view illustrating the cushion illustrated in FIG. 3.

FIG. 3 is a perspective view illustrating a state in which an airbag of the passenger airbag apparatus according to the exemplary embodiment of the present invention is fully inflated, FIG. 4 is a cross-sectional top plan view illustrating the passenger airbag apparatus according to the exemplary embodiment of the present invention which is illustrated in FIG. 3, FIG. 5 is a cross-sectional top plan view illustrating another exemplary embodiment of a groove tether illustrated in FIG. 4, FIG. 6 is a left perspective view illustrating a cushion illustrated in FIG. 3, FIG. 7 is a right perspective view illustrating the cushion illustrated in FIG. 3, and FIG. 8 is a perspective view illustrating a groove panel illustrated in FIG. 3.

Referring to FIGS. 3 to 8, when gas flows into the airbag 10, the airbag 10 is inflated and deployed forward toward the passenger. When the airbag 10 is inflated and deployed, the front side of the airbag 10 is directed toward the passenger, and the passenger comes into contact with the front side of the airbag 10.

A left chamber portion 81, which protrudes forward, is formed at the left side of the front side of the airbag 10 which comes into contact with the passenger, and a right chamber portion 82, which protrudes forward, is formed at the right side of the front side. The left chamber portion 81 and the right chamber portion 82 are disposed to be spaced apart from each other in a left and right direction. The left chamber portion 81 and the right chamber portion 82 are formed at positions that correspond to each other.

A groove tether 100 is installed in the airbag 10. The groove tether 100 is coupled to the front side of the airbag 10 between the left chamber portion 81 and the right chamber portion 82, and coupled to a left side 87 and a right side 88 of the airbag 10, such that the groove tether 100 pulls the front side of the airbag 10 between the left chamber portion 81 and the right chamber portion 82 by being tightened as the airbag 10 is inflated, thereby forming a groove G at the front side of the airbag 10 between the left chamber portion 81 and the right chamber portion 82.

The airbag 10 includes a cushion 80 which has a cushion hole 83 formed from a right side of the left chamber portion 81 to a left side of the right chamber portion 82, and a groove panel 90 which is coupled to the front side of the cushion 80 while shielding the cushion hole 83.

The cushion hole 83 includes a first cushion hole 83a which is formed at a right side of the left chamber portion 81, a second cushion hole 83b which is formed at a left side of the right chamber portion 82 so as to correspond to the first cushion hole 83a, and a third cushion hole 83c which extends between the first cushion hole 83a and the second cushion hole 83b and is positioned rearward from the first cushion hole 83a and the second cushion hole 83b.

The groove panel 90 includes a main shielding portion 91 which shields the third cushion hole 83c, a first side shielding portion 92 which is folded based on a left folding line 91a formed at a left side of the main shielding portion 91, and shields the first cushion hole 83a, and a second side shielding portion 93 which is folded based on a right folding line 91b formed at a right side of the main shielding portion 91, and shields the second cushion hole 83b. The left folding line 91a and the right folding line 91b may be virtual lines. The first side shielding portion 92 is disposed at a left side of the main shielding portion 91, and the second side shielding portion 93 is disposed at a right side of the main shielding portion 91.

In a state in which the groove panel 90 is coupled to the front side of the cushion 80 while shielding the cushion hole 83, the groove G is formed to be recessed rearward between the left chamber portion 81 and the right chamber portion 82. When the airbag 10 is inflated at the time of a vehicle collision accident, a head of the passenger is inserted into the groove G between the left chamber portion 81 and the right chamber portion 82. Therefore, even though the vehicle collides with an object obliquely with respect to a direction in which the vehicle travels, the head of the passenger is prevented by the left chamber portion 81 from being moved to the left, prevented by the right chamber portion 82 from being moved to the right, and held in the groove G. Therefore, even though the vehicle collides with an object obliquely with respect to the direction in which the vehicle travels, the head of the passenger does not slide from the airbag 10 toward one side, and may be kept in contact with the airbag 10.

As illustrated in FIG. 4, one groove tether 100 is provided, such that one end of the groove tether 100 may be coupled to the left side 87 of the airbag 10 by sewing, the other end of the groove tether 100 may be coupled to the right side 88 of the airbag 10 by sewing, and a central portion between the one end and the other end of the groove tether 100 may be coupled to the groove panel 90 by sewing. In addition, as illustrated in FIG. 5, the groove tether may include a first groove tether 101 and a second groove tether 102, such that one end of the first groove tether 101 may be coupled to the groove panel 90 by sewing, the other end of the first groove tether 101 may be coupled to the left side 87 of the airbag 10 by sewing, one end of the second groove tether 102 may be coupled to the groove panel 90 by sewing, and the other end of the second groove tether 102 may be coupled to the right side 88 of the airbag 10 by sewing.

When dividing the airbag 10 vertically, the airbag 10 includes an upper inflatable portion UI which is disposed at an uppermost side, a lower inflatable portion LI which is disposed at a lowermost side, and a middle inflatable portion MI which extends between the upper inflatable portion UI and the lower inflatable portion LI. The left chamber portion 81, the right chamber portion 82, and the cushion hole 83 are formed in the middle inflatable portion MI.

At least one tether 96, 97, 98, or 99 is coupled to a front side of the groove panel 90. At least one tether 96, 97, 98, or 99 is elongated in the left and right direction. At least one tether 96, 97, 98, or 99 includes at least one first tether 96 or 97, and at least one second tether 98 or 99.

At least one first tether 96 or 97 has a longer length than at least one second tether 98 or 99, and at least one second tether 98 or 99 has a shorter length than at least one first tether 96 or 97. At least one first tether 96 or 97 is coupled from the first side shielding portion 92 to the second side shielding portion 93. That is, one end of at least one first tether 96 or 97 is coupled to the first side shielding portion 92, and the other end of at least one first tether 96 or 97 is coupled to the second side shielding portion 93.

The number of at least one first tether 96 or 97 is more than one. That is, at least one first tether 96 or 97 includes a first of first tether 96, and a second of first tether 97 which is disposed to be spaced downward from the first of first tether 96.

At least one second tether 98 or 99 is coupled to the main shielding portion 91 to be elongated in the left and right direction. That is, one end of at least one second tether 98 or 99 is disposed on the left folding line 91a, and the other end of at least one second tether 98 or 99 is disposed on the right folding line 91b. At least one second tether 98 or 99 is disposed between the plurality of first tethers 96 and 97.

The number of at least one second tether 98 or 99 is more than one. That is, at least one second tether 98 or 99 includes a first of second tether 98, and a second of second tether 99 which is disposed to be spaced downward apart from the first of second tether 98.

One end of at least one first tether 96 or 97 is coupled to the first side shielding portion 92, the other end of at least one first tether 96 or 97 is coupled to the second side shielding portion 93, and the central portion of at least one first tether 96 or 97, that is, the remaining portion is coupled to the main shielding portion 91, thereby maintaining a state in which the first side shielding portion 92 and the second side shielding portion 93 are folded from the main shielding portion 91. In addition, at least one first tether 96 or 97 and at least one second tether 98 or 99 reinforce rigidity of the groove panel 90, thereby preventing the groove panel 90 from being damaged by gas pressure in the cushion 80.

The cushion 80 is formed by sewing three pieces of flexible raw fabrics. That is, the cushion 80 includes a main panel 86 which comes into contact with the passenger while being inflated and deployed, and a pair of side panels 87 and 88 which is coupled to both sides of the main panel 86. Circumferences of the pair of side panels 87 and 88 are coupled to both sides of the main panel 86 by sewing, respectively.

The main panel 86 forms a front side, an upper side, a lower side, and a rear side of the cushion 80. The cushion hole 83 is formed at the front side of the main panel 86.

The pair of side panels 87 and 88 forms both sides 87 and 88 of the cushion 80. The pair of side panels 87 and 88 includes a left side panel 87 which has a circumference coupled to the left side of the main panel 86, and a right side panel 88 which has a circumference coupled to the right side of the main panel 86.

Protruding portions 87a and 88a, which protrude forward at positions corresponding to the cushion hole 83, are formed on the pair of side panels 87 and 88. The protruding portions 87a and 88a include a left protruding portion 87a formed on the left side panel 87, and a right protruding portion 88a formed on the right side panel 88.

In a state in which the circumferences of the pair of side panels 87 and 88 are coupled to both sides of the main panel 86, the left chamber portion 81 protrudes forward at the left side of the front side of the cushion 80 by the left protruding portion 87a, and the right chamber portion 82 protrudes forward at the right side of the front side of the cushion 80 by the right protruding portion 88a.

Meanwhile, the airbag 10 needs to be inflated by sufficient pressure in order to ensure cushioning force capable of protecting the passenger, such that the inflator 50 generates gas larger in amount than gas by which the airbag 10 may be fully inflated. Therefore, if gas, which has been generated by the inflator 50 and has flown into the airbag 10, is not discharged, deployment pressure of the airbag 10 becomes excessively high, and as a result, there is a likelihood that the passenger, who comes into contact with the airbag 10, will be injured by the excessively high deployment pressure of the airbag 10.

In order to prevent the deployment pressure of the airbag from becoming excessively high as described above, a vent hole 87b, through which gas is discharged, is formed in the left side panel 87 of the airbag 10, and a vent hole 88b, through which gas is discharged, is formed in the right side panel 88. When the airbag 10 is fully inflated, the passenger comes into contact with the front side of the main panel 86, and the vent holes 87b and 88b, which are formed in the left side panel 87 and the right side panel 88, prevent high-temperature and high-pressure gas from being discharged directly to the passenger through the vent holes 87b and 88b.

Figure 9:
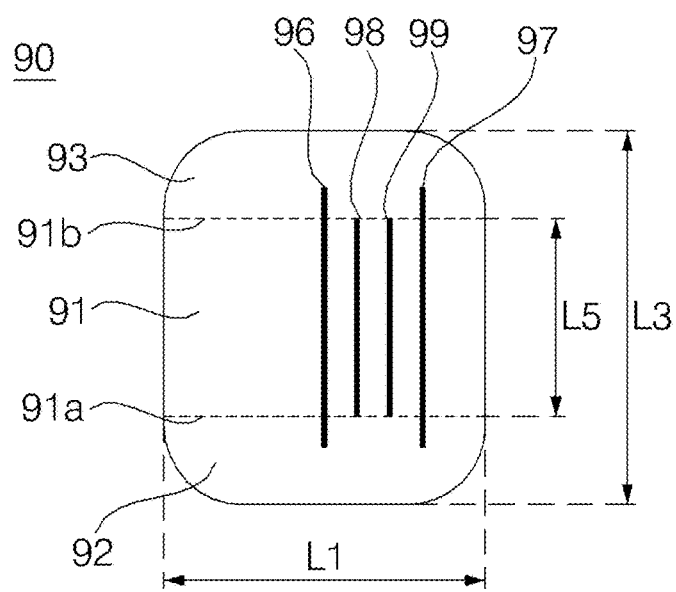
FIG. 9 is a top plan view illustrating a groove panel illustrated in FIG. 3.
Figure 10:
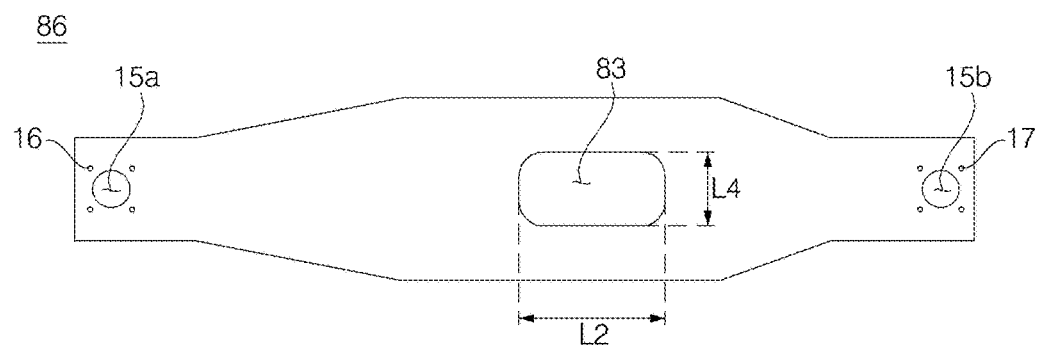
FIG. 10 is a view illustrating a state in which a main panel illustrated in FIG. 3 is spread out before a side panel is coupled to the main panel.

FIG. 9 is a top plan view illustrating the groove panel illustrated in FIG. 3, and FIG. 10 is a view illustrating a state in which the main panel illustrated in FIG. 3 is spread out before the side panel is coupled to the main panel.

Referring to FIGS. 3, 9, and 10, before the groove panel 90 is coupled to the cushion 80, a vertical length L1 of the groove panel 90 is shorter than a vertical length L2 of the cushion hole 83, and a horizontal length L3 of the groove panel 90 is longer than a horizontal length L4 of the cushion hole 83. In addition, a horizontal length L5 of the main shielding portion 91 is equal to the horizontal length L4 of the cushion hole 83.

The main panel 86 is spread out to be flattened, the groove panel 90 is placed on the main panel 86 so that the main shielding portion 91 is positioned at the upper side of the cushion hole 83, a portion of the main panel 86, which corresponds to the left side of the cushion hole 83, is coupled by sewing to surround the circumference of the first side shielding portion 92, a portion of the main panel 86, which corresponds to the right side of the cushion hole 83, is coupled by sewing to surround the circumference of the second side shielding portion 93, a portion of the main panel 86, which corresponds to the upper side of the cushion hole 83, is coupled by sewing to surround an upper end of the main shielding portion 91, and a portion of the main panel 86, which corresponds to the lower side of the cushion hole 83, is coupled by sewing to surround a lower end of the main shielding portion 91, such that the groove panel 90 shields the cushion hole 83, the first side shielding portion 92 protrudes forward to be equal with the left protruding portion 87a, and the second side shielding portion 93 protrudes forward to be equal with the right protruding portion 88a.

In a state in which the main panel 86 is spread out before the main panel 86 coupled to the pair of side panels 87 and 88, the first inflator insertion hole 15a is formed at one end of the main panel 86, and the second inflator insertion hole 15b is formed at the other end of the main panel 86.

Both ends of the main panel 86 overlap each other and are coupled to the retainer 60 so that the first inflator insertion hole 15a and the second inflator insertion hole 15b are matched. Since the gas, which is injected into the airbag 10 from the head portion of the inflator 50, is in a high-temperature/high-pressure state, there is concern that the airbag 10 will be damaged by high-temperature/high-pressure gas injected from the head portion of the inflator 50. To prevent the damage to the airbag 10, a reinforcing fabric is attached to a portion where the inflator 50 is coupled to the airbag 10 to prevent damage to the airbag 10 in the related art, but in the present exemplary embodiment, one end of the main panel 86 at which the first inflator insertion hole 15a is formed and the other end of the main panel 86 at which the second inflator insertion hole 15b is formed overlap each other to form a portion to which the inflator 50 is coupled, and as a result, it is not necessary to attach the reinforcing fabric to the portion to which the inflator 50 is coupled.

Hereinafter, a process of manufacturing the passenger airbag apparatus according to the exemplary embodiment of the present invention will be described.

Figure 11:
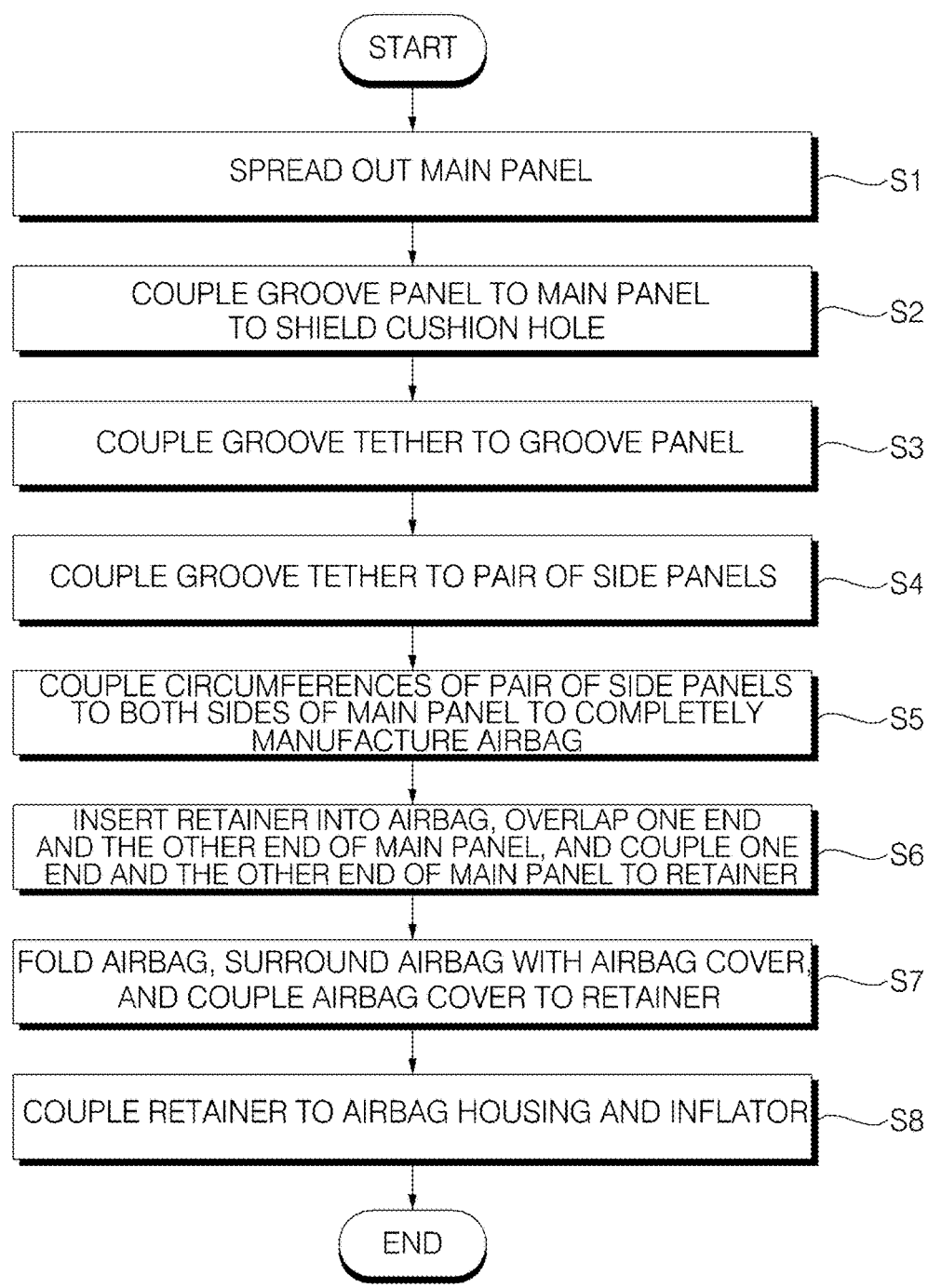
FIG. 11 is a flowchart of a method of manufacturing the passenger airbag apparatus according to the exemplary embodiment of the present invention.

FIG. 11 is a flowchart of a method of manufacturing the passenger airbag apparatus according to the exemplary embodiment of the present invention.

Referring to FIGS. 1 to 11, a process of manufacturing the airbag 10 will be described first.

In order to manufacture the airbag 10, the main panel 86 which has a cushion hole formed at a portion that forms the front side of the airbag 10, the pair of side panels 87 and 88 which have the protruding portions 87a and 88b that protrude forward at the front sides of the pair of side panels 87 and 88, and the groove panel 90 are prepared. In this case, the first tethers 96 and 97 and the second tethers 98 and 99 are coupled to the groove panel 90.

In first step S1, the main panel 86 is spread out to be flattened as illustrated in FIG. 10.

In second step S2, the groove panel 90 is coupled to the portion of the main panel 86 which forms the front side of the cushion 80, thereby shielding the cushion hole 83. That is, after the groove panel 90 is placed on the main panel 86, the portion of the main panel 86, which corresponds to the left side of the cushion hole 83, is coupled by sewing to surround the circumference of the first side shielding portion 92, the portion of the main panel 86, which corresponds to the right side of the cushion hole 83, is coupled by sewing to surround the circumference of the second side shielding portion 93, the portion of the main panel 86, which corresponds to the upper side of the cushion hole 83, is coupled by sewing to surround the upper end of the main shielding portion 91, and the portion of the main panel 86, which corresponds to the lower side of the cushion hole 83, is coupled by sewing to surround the lower end of the main shielding portion 91, such that the groove panel 90 shields the cushion hole 83.

In third step S3, the groove tether 100 is coupled to the groove panel 90. If one groove tether 100 is provided, the central portion between both ends of the groove tether 100 is coupled to the groove panel 90. Further, if the groove tether includes the first groove tether 101 and the second groove tether 102, one end of the first groove tether 101 is coupled to the groove panel 90, and one end of the second groove tether 102 is coupled to the groove panel 90.

In fourth step S4, the groove tether 100 is coupled to the pair of side panels 87 and 88. If one groove tether 100 is provided, one end of the groove tether 100 is coupled to the left side panel 87 that forms the left side of the airbag 10, and the other end of the groove tether 100 is coupled to the right side panel 88 that forms the right side of the airbag 10. Further, if the groove tether includes the first groove tether 101 and the second groove tether 102, the other end of the first groove tether 101 is coupled to the left side panel 87, and the other end of the second groove tether 102 is coupled to the right side panel 88.

In fifth step S5, the circumferences of the pair of side panels 87 and 88 are coupled to both sides of the main panel 86, respectively, thereby forming the left chamber portion 81 and the right chamber portion 82, which correspond to the protruding portions 87a and 88a, at the front side of the airbag 10, and completely manufacturing the airbag 10. In the airbag 10 which is completely manufactured as described above, the first protruding portion 87a is disposed to correspond to the first side shielding portion 92, and the first protruding portion 97a and the first side shielding portion 92 equally protrude forward, such that the left chamber portion 81, which protrudes forward, is formed at the left side of the front side of the airbag 10. In addition, the second protruding portion 88a is disposed to correspond to the second side shielding portion 93, and the second protruding portion 88a and the second side shielding portion 93 equally protrude forward, such that the right chamber portion 82, which protrudes forward, is formed at the right side of the front side of the airbag 10. In addition, in the airbag 10 which is completely manufactured as described above, both ends of the main panel 86 are not coupled to each other, and the rear side of the airbag 10 is opened.

Hereinafter, a process of coupling the airbag 10, which is completely manufactured as described above, to the airbag housing 30 and the inflator 50 will be described.

In sixth step S6, the retainer 60 is inserted into the airbag 10 through the opened rear side of the airbag 10, and thereafter, one end of the main panel 86 at which the first inflator insertion hole 15a is formed and the other end of the main panel 86 at which the second inflator insertion hole 15b is formed overlap each other, and then are coupled to the retainer 60. The retainer 60 is inserted into the airbag 10 in a state in which the fastening member 70 is coupled to the retainer 60, and the fastening member 70 penetrates the first fastening hole 16 formed at one end of the main panel 86, and then penetrates the second fastening hole 17 formed at the other end of the main panel 86, such that the one end and the other end of the main panel 86 overlap each other, and then are coupled to the retainer 60 by means of the fastening member 70. As described above, in a state in which the one end and the other end of the main panel 86 overlap each other and then are coupled to the retainer 60, the first inflator insertion hole 15a and the second inflator insertion hole 15b are matched.

In seventh step S7, the airbag 10 is folded and surrounded by the airbag cover 20, and then the airbag cover 20 is coupled to the retainer 60. A portion of the fastening member 70, which penetrates the first fastening hole 16 and the second fastening hole 17 and protrudes to the outside of the airbag 10, penetrates the airbag cover 20, such that the airbag cover 20 is coupled to the retainer 60 by means of the fastening member 70.

In eighth step S8, the retainer 60 is coupled to the airbag housing 30 and the inflator 50, and as a result, the passenger airbag apparatus is completely assembled. After the airbag cover 20 is inserted into the airbag housing 30 while surrounding the airbag 10, the fastening member 70 is fastened while sequentially penetrating the airbag housing 30, the front mounting plate 40, and the flange 55 of the inflator 50, such that the retainer 60 is coupled to the airbag housing 30 and the inflator 50 by means of the fastening member 70. In a state in which the retainer 60 is coupled to the airbag housing 30 and the inflator 50 as described above, the head portion of the inflator 50 is in the state of being inserted into the airbag 10 through the first inflator insertion hole 15a and the second inflator insertion hole 15b.

As described above, according to the passenger airbag apparatus according to the exemplary embodiment of the present invention and the passenger airbag apparatus manufactured by the method of manufacturing the same, the head of the passenger is inserted between the left chamber portion 81 and the right chamber portion 82 of the airbag 10 at the time of a vehicle collision, and as a result, even though the vehicle collides with an object obliquely with respect to the direction in which the vehicle travels, the head of the passenger does not slide to the left or right, thereby maintaining a contact state with the airbag 10.

Only one cushion hole 83 is formed from the right side of the left chamber portion 81 to the left side of the right chamber portion 82, and then the groove panel 90 shields the cushion hole 83, such that the left chamber portion 81 and the right chamber portion 82 may be formed in the airbag 10, and as a result, the process of forming the left chamber portion 81 and the right chamber portion 82 is simplified.

It may be understood by a person skilled in the art that the present invention may be carried out in other specific forms without changing the technical spirit or the essential characteristics of the present invention. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A passenger airbag apparatus comprising:
   an airbag which is deployed forward toward a passenger when gas flows into the airbag, and has a left chamber portion that protrudes forward at a left side of a front side of the airbag, and a right chamber portion that protrudes forward at a right side of the front side of the airbag so as to be spaced apart from the left chamber portion;

a groove tether which is coupled to an inner surface of the front side of the airbag, between the left chamber portion and the right chamber portion which are spaced apart from each other, and left and right sides of the airbag, and pulls the front side of the airbag between the left chamber portion and the right chamber portion, which are spaced apart from each other, as the airbag is inflated; and at least one auxiliary tether which is coupled to an outer surface of the front side of the airbag so as to be elongated in a left and right direction.

2. The passenger airbag apparatus of claim 1, wherein the airbag includes a cushion which has a cushion hole formed from a right side of the left chamber portion to a left side of the right chamber portion, and a groove panel which is coupled to a front side of the cushion while shielding the cushion hole, and the groove tether is coupled to the groove panel and the left and right sides of the cushion, and pulls the groove panel as the cushion is inflated.

3. The passenger airbag apparatus of claim 2, wherein the cushion includes:
 a main panel which forms the front side of the airbag, and has the cushion hole; and
 a pair of side panels which has circumferences coupled to both sides of the main panel to form the left side and the right side of the airbag, and has protruding portions that protrude forward at positions corresponding to the cushion hole.

4. The passenger airbag apparatus of claim 2, wherein the cushion hole includes:
 a first cushion hole which is formed at a right side of the left chamber portion;
 a second cushion hole which is formed at a left side of the right chamber portion so as to correspond to the first cushion hole; and
 a third cushion hole which extends between the first cushion hole and the second cushion hole, and is positioned rearward from the first cushion hole and the second cushion hole.

5. The passenger airbag apparatus of claim 2, wherein the at least one auxiliary tether is coupled to the groove panel.

6. The passenger airbag apparatus of claim 1, wherein one end of the groove tether is coupled to a left side of the airbag, the other end of the groove tether is coupled to a right side of the airbag, and a central portion between the one end and the other end of the groove tether is coupled to the front side of the airbag between the left chamber portion and the right chamber portion which are spaced apart from each other.

7. The passenger airbag apparatus of claim 1, wherein the groove tether includes:
 a first groove tether which has one end coupled to the front side of the airbag between the left chamber portion and the right chamber portion which are spaced apart from each other, and the other end coupled to a left side of the airbag; and
 a second groove tether which has one end coupled to the front side of the airbag between the left chamber portion and the right chamber portion which are spaced apart from each other, and the other end coupled to a right side of the airbag.

8. The passenger airbag apparatus of claim 1, wherein the airbag includes an upper inflatable portion which is disposed at an uppermost side, a lower inflatable portion which is disposed at a lowermost side, and a middle inflatable portion which extends between the upper inflatable portion and the lower inflatable portion, and the left chamber portion and the right chamber portion are formed at the middle inflatable portion.

9. A passenger airbag apparatus comprising:
 an airbag which is deployed forward toward a passenger when gas flows into the airbag, and has a left chamber portion that protrudes forward at a left side of a front side of the airbag, and a right chamber portion that protrudes forward at a right side of the front side of the airbag so as to be spaced apart from the left chamber portion; and
 a groove tether which is coupled to the front side of the airbag, between the left chamber portion and the right chamber portion which are spaced apart from each other, and left and right sides of the airbag, and pulls the front side of the airbag between the left chamber portion and the right chamber portion, which are spaced apart from each other, as the airbag is inflated,
 wherein the airbag includes a cushion which has a cushion hole formed from a right side of the left chamber portion to a left side of the right chamber portion, and a groove panel which is coupled to a front side of the cushion while shielding the cushion hole, and the groove tether is coupled to the groove panel and the left and right sides of the cushion, and pulls the groove panel as the cushion is inflated,
 wherein the cushion includes:
  a main panel which forms the front side of the airbag, and has the cushion hole; and
  a pair of side panels which has circumferences coupled to both sides of the main panel to form the left side and the right side of the airbag, and has protruding portions that protrude forward at positions corresponding to the cushion hole,
 wherein one end of the main panel, at which a first inflator insertion hole into which a head portion of the inflator for generating gas is inserted is formed, and the other end of the main panel, at which a second inflator insertion hole into which the head portion of the inflator is inserted is formed, overlap each other.

10. A passenger airbag apparatus comprising:
 an airbag which is deployed forward toward a passenger when gas flows into the airbag, and has a left chamber portion that protrudes forward at a left side of a front side of the airbag, and a right chamber portion that protrudes forward at a right side of the front side of the airbag so as to be spaced apart from the left chamber portion; and
 a groove tether which is coupled to the front side of the airbag, between the left chamber portion and the right chamber portion which are spaced apart from each other, and left and right sides of the airbag, and pulls the front side of the airbag between the left chamber portion and the right chamber portion, which are spaced apart from each other, as the airbag is inflated,
 wherein the airbag includes a cushion which has a cushion hole formed from a right side of the left chamber portion to a left side of the right chamber portion, and a groove panel which is coupled to a front side of the cushion while shielding the cushion hole, and the groove tether is coupled to the groove panel and the left and right sides of the cushion, and pulls the groove panel as the cushion is inflated,
 wherein the cushion hole includes:
  a first cushion hole which is formed at a right side of the left chamber portion;

a second cushion hole which is formed at a left side of the right chamber portion so as to correspond to the first cushion hole; and a third cushion hole which extends between the first cushion hole and the second cushion hole, and is positioned rearward from the first cushion hole and the second cushion hole, wherein the groove panel includes:

a main shielding portion which shields the third cushion hole;

a first side shielding portion which is folded based on a left folding line formed at a left side of the main shielding portion, and shields the first cushion hole; and a second side shielding portion which is folded based on a right folding line formed at a right side of the main shielding portion, and shields the second cushion hole.

11. The passenger airbag apparatus of claim 10, wherein in a state before the groove panel is coupled to the cushion, a vertical length of the groove panel is shorter than a vertical length of the cushion hole, a horizontal length of the groove panel is longer than a horizontal length of the cushion hole, a horizontal length of the main shielding portion is equal to a horizontal length of the cushion hole, a portion of the main panel, which corresponds to a left side of the cushion hole, is coupled to a circumference of the first side shielding portion, a portion of the main panel, which corresponds to a right side of the cushion hole, is coupled to a circumference of the second side shielding portion, a portion of the main panel, which corresponds to an upper side of the cushion hole, is coupled to an upper end of the main shielding portion, and a portion of the main panel, which corresponds to a lower side of the cushion hole, is coupled to a lower end of the main shielding portion.

12. The passenger airbag apparatus of claim 10, further comprising:

at least one first auxiliary tether which is coupled from the first side shielding portion to the second side shielding portion; and at least one second auxiliary tether which is coupled to the main shielding portion so as to be elongated in the left and right direction.

13. The passenger airbag apparatus of claim 12, wherein the at least one first auxiliary tether includes a plurality of first auxiliary tethers, and the at least one second auxiliary tether is disposed between the plurality of first auxiliary tethers.

* * * * *